US011652649B2

(12) United States Patent
Aronson (10) Patent No.: US 11,652,649 B2
(45) Date of Patent: *May 16, 2023

(54) SENSOR SECURED BY PHYSICAL UNCLONABLE FUNCTION (PUF)

(71) Applicant: CERA Licensing Limited, Central Hong Kong (HK)

(72) Inventor: Bill Aronson, London (GB)

(73) Assignee: CERA Licensing Limited, Central Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,567

(22) Filed: Nov. 16, 2022

(65) Prior Publication Data

US 2023/0081607 A1  Mar. 16, 2023

Related U.S. Application Data

(63) Continuation of application No. 17/131,123, filed on Dec. 22, 2020, now Pat. No. 11,516,028, which is a
(Continued)

(30) Foreign Application Priority Data

| Dec. 24, 2019 | (GB) | 1919297 |
| Aug. 27, 2020 | (GB) | 2013492 |
| Nov. 10, 2020 | (GB) | 2017713 |

(51) Int. Cl.
*H04L 9/32* (2006.01)
*H04L 9/08* (2006.01)
*G06F 21/60* (2013.01)

(52) U.S. Cl.
CPC .......... *H04L 9/3278* (2013.01); *G06F 21/602* (2013.01); *H04L 9/0861* (2013.01); *H04L 9/3297* (2013.01)

(58) Field of Classification Search
CPC ................. H04L 9/3278; H04L 9/0861; H04L 9/3297; G06F 21/602
See application file for complete search history.

(56) References Cited

U.S. PATENT DOCUMENTS

| 4,714,066 A | 12/1987 | Jordan |
| 7,024,565 B1 | 4/2006 | Beiley et al. |
(Continued)

FOREIGN PATENT DOCUMENTS

| CN | 102265395 A | 11/2011 |
| CN | 101553829 B | 1/2012 |
(Continued)

OTHER PUBLICATIONS

Aarestad, J., Plusquellic, J., & Acharyya, D., "Error-Tolerant Bit Generation Techniques for Use With a Hardware-Embedded Path Delay PUF" (2013) pgs.
(Continued)

*Primary Examiner* — Oleg Korsak
(74) *Attorney, Agent, or Firm* — Ungerman IP PLLC; Mark E. Ungerman (57) ABSTRACT

Any electrical component that is responsive to a physical or environmental phenomenon may be used to create a secure sensor. A secure sensor may include a first electrical component having a first side connected to a voltage source, a second component having a first side connected to the voltage source, an analog comparator having a first input connected to a second side of the first component and a second input connected to a second side of the second component and an output that represents at least one bit of a key, and an analog to digital converter having an input connected to the second side of the first component wherein an output of said analog to digital converter is related to a physical phenomenon that the component responds to by a coefficient of the components characteristic. The first com-
(Continued)

ponent and the second component may have the same nominal value. The first component, the second component and the analog to digital comparator may be encased in the same package. The package may be configured to inhibit inspection and discovery of components contained in said package. A processor may be connected to a key register and to a table containing the information related to the sensed physical phenomenon wherein the processor may be configured to store the key bits in the key register and is configured to store data corresponding to the sensed physical phenomenon. The processor may be configured to store a time stamp associated with an entry in the table. A communications interface may be connected to the processor.

15 Claims, 5 Drawing Sheets

Related U.S. Application Data continuation-in-part of application No. 16/789,264, filed on Feb. 12, 2020, now Pat. No. 11,044,108.

(56) References Cited

U.S. PATENT DOCUMENTS

| | | |
|---|---|---|
| 7,898,283 B1 | 3/2011 | Koushanfar et al. |
| 8,300,450 B2 | 10/2012 | Christensen et al. |
| 8,347,091 B2 | 1/2013 | Nonaka et al. |
| 8,446,694 B1 | 5/2013 | Tian et al. |
| 8,468,186 B2 | 6/2013 | Yu |
| 8,516,269 B1 | 8/2013 | Hamlet et al. |
| 8,525,169 B1 | 9/2013 | Edelstein et al. |
| 8,525,549 B1 | 9/2013 | Feng et al. |
| 8,622,310 B2 | 1/2014 | Besling et al. |
| 8,659,124 B2 | 2/2014 | Roest et al. |
| 8,741,713 B2 | 6/2014 | Bruley et al. |
| 8,848,417 B2 | 9/2014 | Petitprez |
| 9,018,972 B1 | 4/2015 | Gurrieri et al. |
| 9,088,278 B2 | 7/2015 | Pfeiffer et al. |
| 9,117,824 B2 | 8/2015 | Feng et al. |
| 9,331,012 B2 | 5/2016 | Feng et al. |
| 9,430,406 B2 | 8/2016 | Sluis et al. |
| 9,476,772 B2 | 10/2016 | Lane et al. |
| 9,576,914 B2 | 2/2017 | Li et al. |
| 9,590,626 B1 | 3/2017 | Pedersen |
| 9,666,582 B1 | 5/2017 | Li et al. |
| 9,680,643 B2 | 6/2017 | Meyer |
| 9,710,404 B2 | 7/2017 | Schulz et al. |
| 9,762,241 B1 | 9/2017 | Augustine et al. |
| 9,767,459 B1 | 9/2017 | Teplinsky et al. |
| 9,859,018 B2 | 1/2018 | Ghosh et al. |
| 9,876,645 B1 | 1/2018 | Ramalingam et al. |
| 9,892,783 B2 | 2/2018 | Yoshimoto et al. |
| 9,959,430 B2 | 5/2018 | Hamilton et al. |
| 9,985,791 B2 | 5/2018 | Cambou |
| 10,048,939 B2 | 8/2018 | Plusquellic |
| 10,107,855 B1 | 10/2018 | Corbett et al. |
| 10,148,653 B2 | 12/2018 | Lawson et al. |
| 10,164,640 B1 | 12/2018 | Lu et al. |
| 10,224,931 B1 | 3/2019 | Wang et al. |
| 10,453,388 B2 | 10/2019 | Lee et al. |
| 10,552,645 B2 | 2/2020 | Krawczewicz et al. |
| 10,560,095 B2 | 2/2020 | O'Dwyer et al. |
| 10,742,221 B2 | 8/2020 | Usuda et al. |
| 10,749,694 B2 | 8/2020 | Adams et al. |
| 10,977,345 B2* | 4/2021 | Gordon et al. |
| 11,044,108 B1* | 6/2021 | Aronson ............ H04L 9/0866 |
| 11,374,775 B2* | 6/2022 | Aronson ............ H04L 9/3213 |
| 11,516,028 B2* | 11/2022 | Aronson ............ H04L 9/3297 |
| 2003/0204743 A1 | 10/2003 | Devadas et al. |
| 2005/0127785 A1 | 6/2005 | Zeighami |
| 2007/0278976 A1 | 12/2007 | Kawaguchi et al. |
| 2008/0143214 A1 | 6/2008 | McNamara et al. |
| 2008/0212643 A1 | 9/2008 | McGahhey et al. |
| 2008/0231418 A1 | 9/2008 | Ophey et al. |
| 2008/0256600 A1 | 10/2008 | Schrijen et al. |
| 2009/0083833 A1 | 3/2009 | Ziola et al. |
| 2009/0309616 A1 | 12/2009 | Klinghult et al. |
| 2010/0127822 A1 | 5/2010 | Devadas |
| 2011/0002461 A1 | 1/2011 | Erhart et al. |
| 2011/0163088 A1 | 7/2011 | Besling et al. |
| 2011/0246792 A1 | 10/2011 | Weingarten |
| 2011/0317829 A1 | 12/2011 | Ficke et al. |
| 2012/0055257 A1 | 3/2012 | Shaw-Klein |
| 2014/0181986 A1 | 6/2014 | Guo |
| 2014/0327468 A1 | 11/2014 | Pfeiffer et al. |
| 2014/0355381 A1 | 12/2014 | Lal et al. |
| 2015/0007353 A1 | 1/2015 | Widdershoven et al. |
| 2015/0058928 A1 | 2/2015 | Guo et al. |
| 2016/0036119 A1 | 2/2016 | Baringer |
| 2016/0047855 A1 | 2/2016 | Bhunia et al. |
| 2016/0092680 A1 | 3/2016 | Hennig et al. |
| 2017/0085578 A1 | 3/2017 | Ha et al. |
| 2017/0310489 A1 | 10/2017 | Sluis et al. |
| 2017/0344761 A1 | 11/2017 | Jennings et al. |
| 2017/0345116 A1 | 11/2017 | Katoh |
| 2018/0148058 A1 | 5/2018 | Larsson et al. |
| 2018/0191512 A1 | 7/2018 | Tomishima |
| 2018/0234413 A1 | 8/2018 | Watanabe et al. |
| 2018/0321092 A1 | 11/2018 | Jones et al. |
| 2018/0337793 A1 | 11/2018 | Park et al. |
| 2019/0026457 A1 | 1/2019 | Plusquellic et al. |
| 2019/0026724 A1 | 1/2019 | Wade et al. |
| 2019/0028282 A1 | 1/2019 | Sharifi et al. |
| 2019/0052461 A1 | 2/2019 | Kreder, III et al. |
| 2019/0101456 A1 | 4/2019 | Phillips et al. |
| 2019/0325171 A1 | 10/2019 | Obermaier et al. |
| 2019/0363714 A1 | 11/2019 | O'Dwyer et al. |

FOREIGN PATENT DOCUMENTS

| | | |
|---|---|---|
| CN | 105740731 A | 7/2016 |
| CN | 105978694 A | 9/2016 |
| CN | 106815626 A | 6/2017 |
| CN | 106997843 A | 8/2017 |
| CN | 107251475 A | 10/2017 |
| CN | 104541369 B | 1/2018 |
| CN | 104852727 B | 2/2018 |
| CN | 107689237 A | 2/2018 |
| CN | 108694336 A | 10/2018 |
| CN | 108875430 A | 11/2018 |
| CN | 108875431 A | 11/2018 |
| CN | 108880818 A | 11/2018 |
| DE | 102013205729 A1 | 10/2014 |
| DE | 112013003530 | 3/2017 |
| EP | 2779067 A1 | 9/2014 |
| EP | 2722191 B1 | 5/2015 |
| EP | 1972090 B1 | 8/2015 |
| EP | 3067875 A1 | 9/2016 |
| EP | 3193281 A1 | 7/2017 |
| EP | 3373186 A1 | 9/2018 |
| EP | 2115652 B1 | 4/2019 |
| ES | 2632958 | 9/2017 |
| FR | 2980920 A1 | 4/2013 |
| GB | 2366603 A | 3/2002 |
| JP | 2013131868 A | 7/2013 |
| JP | 5782519 B2 | 9/2015 |
| JP | 2016105278 A | 6/2016 |
| JP | 2016105344 A | 6/2016 |
| JP | 2016105585 A | 6/2016 |
| JP | 5956313 B2 | 7/2016 |
| JP | 2017011678 A | 1/2017 |
| JP | 2017169049 A | 9/2017 |
| JP | 2017215935 A | 12/2017 |
| JP | 2017216030 A | 12/2017 |
| JP | 6284630 B2 | 2/2018 |
| JP | 2018120578 A | 8/2018 |
| JP | 2018136757 A | 8/2018 |
| KR | 101080511 B1 | 11/2011 |
| KR | 101408619 B1 | 6/2014 |
| KR | 101442401 B1 | 9/2014 |
| KR | 20150031776 A | 3/2015 |

(56) References Cited

FOREIGN PATENT DOCUMENTS

| | | |
|---|---|---|
| KR | 101541597 B1 | 8/2015 |
| KR | 101610625 B1 | 4/2016 |
| KR | 20170094326 A | 8/2017 |
| KR | 101852115 B1 | 4/2018 |
| KR | 20180125860 A | 11/2018 |
| WO | 2007069190 A2 | 6/2007 |
| WO | 2008056612 A1 | 5/2008 |
| WO | 2011157750 A2 | 12/2011 |
| WO | 2015112153 A1 | 7/2015 |
| WO | 2018106509 A1 | 6/2018 |
| WO | 2018162938 A1 | 9/2018 |
| WO | 2018175973 A1 | 9/2018 |
| WO | 2019011607 A1 | 1/2019 |
| WO | 2019018557 A1 | 1/2019 |
| WO | 2019036356 A1 | 2/2019 |
| WO | 2019055307 A1 | 3/2019 |

OTHER PUBLICATIONS

Analog Devices, Inc , "20190363714 Impedance-Based Physical Unclonable Function", May 23, 2018, 23 pgs., Justia Patents, retrieved Mar. 5, 2021 from https://patentsjustia.com/patent/201980363714.
Becker, G.T., Raghavan, K., "Active and Passive Side-Channel Attacks on Delay Based PUF Designs" (2014) pp. 1-14.
Bhargava, Mudit. "Reliable, Secure, Efficient Physical Unclonable Functions." Carnegie Mellon University (May 2013), Pittsburgh, PA.
Carson Labrado et al., Use of Thermistor Temperature Sensors for Cyber-Physical System Security, Sep. 10, 2019, Sensors 2019, 19(18), 3905, MDPI.
Che, W., Martin, M., Pocklassery, G., Kajuluri, V., Saqib, F. & Plusquellic, J., "A Privacy-Preserving, Mutual PUF-Based Authentication Protocol." Cryptography, 1(1), 3., (2016) MDPI.
Choi, S., Zage, D., Choe, Y. R., & Wasilow, B., "Physically Unclonable Digital ID, IEEE International Conference on Mobile Services" (2015), pp. 1-7, Sandia National Laboratories.
Clarke, Peter, "London Calling: Security technology takes time." EE Times, (Feb. 22, 2013), Aspencore Network, retrieved Mar. 11, 2020.
Delvaux, J., & Verbauwhede, I., "Attacking PUF-Based Pattern Matching Key Generators via Helper Data Manipulation." Topics in Cryptology—CT-RSA, 2014 Lecture Notes in Computer Science, Ku Leuven Belgium, 106-131.
Eetimes, "NXP and Intrinsix-ID to raise smart chip security." EE Times, (Jan. 21, 2010), Aspencore Network, retrieved Mar. 11, 2020.
Herder, C., Yu, M-D., Koushanfar, F., & Devadas, S., "Physical Unclonable Functions and Applications: A Tutorial." Proceedings of the IEEE, 102(8), (2014), pp. 1126-1141.
Herder, Charges; Ren, Ling; Van Dijk, Marten; Yu, Meng-Day; & Devadas, Srinivas (Jan. 1, 2017). "Trapdoor computational fuzzy extractors and stateless cryptographically-secure physical unclonable functions." IEEE Transactions on Dependable and Secure Computing. 14 (1): 65-82.
Kim et al., Piezoelectric Polymeric Thin Films Tuned by Carbon Nanotube Fillers, Proc. SPIE 6932 Sensors and Smart Structures Technologies for Civil, Mechanical, and Aerospace Systems 2008, 693232 (Apr. 8, 2008), Abstract; p. 693232-2.
Maes, Roel, Van Der Leest, Vincent, "Countering the Effects of Silicon Aging on SRAM PUFs" retrieved Mar. 11, 2020.
Naccache, David, European Patent No. 0583709A1, "Unforgeable identification device, identification device reader and method of identification", published Feb. 23, 1994.
Saqib, F., Plusquellic, J., Areno, M., & Aarestad, J., "An ASIC Implementation of a Hardware-Embedded Physical Unclonable Function." IET Computers & Digital Techniques, 8(6), (2014), pp. 288-299.
Van Herrewege, A., "Lightweight PUF-based Key and Random Number Generation" (2015) pp. 1-206, KU Leuven Arenberg Doctoral School Faculty of Engineering Science, Belgium.
Vijayakumar, Arunkumar,Patil, Vinay C., Kundu, Sandip, "On Improving Reliability of SRAM-Based Physically Unclonable Functions." J. Low Power Electron, Appl. 2017, 7,2, pp. 1-15, University of Massachusetts Amherts (Jan. 12, 2017) MDPI.
Wikipedia contributors (Aug. 8, 2019). "Physical Unclonable Functions and Applications." Wikipedia, The Free Encyclopedia, https://en.wikipedia/w/index.php?title=Physical_unclonable-function&oldid=911114732, retrieved May 8, 2020.
Y. Cao, Y. Guo, B. Liu, W. Ge, M. Zhu and C. Chang, "A Fully Digital Physical Unclonable Function Based Temperature Sensor for Secure Remote Sensing," 2018 27th International Conference on Computer Communication and Networks (ICCCN), Hangzhou, 2018, pp. 1-8, doi: 10.1109/ICCCN.2018.8487347. (Year: 2018).

* cited by examiner

SENSOR SECURED BY PHYSICAL UNCLONABLE FUNCTION (PUF)

CROSS-REFERENCE TO RELATED APPLICATIONS

This application is a continuation of application Ser. No. 17/131,123 filed Dec. 22, 2020, which shall issue on Nov. 29, 2022 as U.S. Pat. No. 11,516,028, which is a continuation-in-part of application Ser. No. 16/789,264 filed Feb. 12, 2020, now U.S. Pat. No. 11,044,108 issued on Jun. 22, 2021, which claims priority to GB Patent Application No. GB1919297.0 and shows a method sensing a physical phenomenon and performing a physical unclonable function using intrinsic properties of electrical components. This application also claims priority to GB Patent Application No. GB2013492.0 filed on Aug. 27, 2020 and GB 2017713.5 filed on Nov. 10, 2020. This application is related to U.S. application Ser. No. 17/354,518 filed on Jun. 22, 2021, now U.S. patent Ser. No. 11/374,775 issued on Jun. 28, 2022, which is a continuation of U.S. application Ser. No. 16/789, 264 filed on Feb. 12, 2020, now U.S. Pat. No. 11,044,108 issued on Jun. 22, 2021.

The subject matter is related to U.S. Patent Application Nos. PCT/US2019/012537 and PCT/US2019/012556, the disclosures of which are expressly incorporated by reference herein.

BACKGROUND OF THE INVENTION

1. Field of the Invention

The present invention relates to authentication and security, and more particularly to a physical unclonable function (PUF) with a secure sensor.

2. Description of the Related Technology

A physical unclonable function (sometimes also called physically unclonable function), or PUF, is a physically-defined "digital fingerprint" that serves as a unique identity for a device. A PUF is based on unique physical variations which occur naturally during manufacturing. A PUF is embodied in a physical structure. PUFs are implemented in integrated circuits and are used in applications with high-security requirements, more specifically cryptography. https://en.wikipedia.org/Physical_uncloneable_function U.S. Patent Application No. PCT/US2019/012537 entitled "Hypercomputation with Programmable Matter" shows a system that provides a new way of computing by exploiting the electrical and acoustic properties of piezo materials for computation.

U.S. Patent Application No. PCT/US2019/012556 entitled "Secure Programmable Matter" shows a method for performing secure computation using a solid volume of material to which a number of electrodes are attached.

References to systems that exploit the physical properties of disordered systems for authentication purposes date back to Bauder in 1983 and Simmons in 1984. Naccache and Frémanteau provided an authentication scheme in 1992 for memory cards. The terms POWF (physical one-way function) and PUF (physical unclonable function) were coined in 2001 and 2002, the latter publication describing the first integrated PUF where, unlike PUFs based on optics, the measurement circuitry and the PUF are integrated onto the same electrical circuit (and fabricated on silicon).

Over 40 types of PUF have been suggested. These range from PUFs that evaluate an intrinsic element of a pre-existing integrated electronic system to concepts that involve explicitly introducing random particle distributions to the surface of physical objects for authentication. All PUFs are subject to environmental variations such as temperature, supply voltage, and electromagnetic interference, which can affect their performance. Therefore, rather than just being random, the real power of a PUF is its ability to be different between devices, but simultaneously to be the same under different environmental conditions on the same device.

From 2010 to 2013, PUFs gained attention in the smartcard market as a promising way to provide "silicon fingerprints", creating cryptographic keys that are unique to individual smartcards. PUFs are now established as a secure alternative to battery-backed storage of secret keys in commercial FPGAs.

PUFs depend on the uniqueness of their physical structure. This structure should depend on random physical factors introduced during manufacturing. When the factors are unpredictable and uncontrollable, it is virtually impossible to duplicate or clone the structure.

PUFs may implement challenge-response authentication to evaluate this microstructure. When a physical stimulus is applied to the structure, it reacts in an unpredictable (but repeatable) way due to the complex interaction of the stimulus with the physical microstructure of the device. A specific challenge and its corresponding response together form a challenge-response pair or CRP. The device's identity is established by the properties of the microstructure itself. As this structure is not directly revealed by the challenge-response mechanism, such a device is resistant to spoofing attacks.

Using a fuzzy extractor or key extractor PUFs can also be used to extract a unique strong cryptographic key from a physical structure. The same unique key is reconstructed every time the PUF is evaluated. The challenge-response mechanism is then implemented using cryptography.

PUFs can be implemented with a very small hardware investment. Unlike a ROM containing a table of responses to all possible challenges, which would require hardware exponential in the number of challenge bits, a PUF can be constructed in hardware proportional to the number of challenge and response bits. In some cases, PUFs can even be built from existing hardware with the right properties.

Unclonability means that each PUF device has a unique and unpredictable way of mapping challenges to responses, even if it was manufactured with the same process as a similar device, and it is infeasible to construct a PUF with the same challenge-response behavior as another given PUF because exact control over the manufacturing process is infeasible. Mathematical unclonability means that it should be very hard to compute an unknown response given the other CRPs or some of the properties of the random components from a PUF.

Note that a PUF is "Unclonable" using the same physical implementation, but care must be taken to protect against other forms of attack such as side-channel analysis or that a model can't be used to predict a response.

In many applications, it is important that the output is stable. Error correction may be required if the PUF is used for a key in cryptographic algorithms to correct any errors caused by the underlying physical processes and reconstruct exactly the same key each time under all operating conditions. In principle, there are two basic concepts: Pre-Processing and Post-Processing Error Correction.

Strategies have been developed which lead a static random-access memory (SRAM) PUF to become more reliable over time without degrading the other PUF quality measures such as security and efficiency. Research at Carnegie Mellon University into various PUF implementations found that some error reduction techniques reduced errors in PUF response in a range of ~70 percent to ~100 percent. Research at the University of Massachusetts Amherst to improve the reliability of SRAM PUF-generated keys posited an error correction technique to reduce the error rate.

PUF technology can be licensed from several companies including eMemory Technology Inc., ICTK Co., Ltd., Intrinsic ID, Inc., Invia, QuantumTrace and Verayo, Inc. PUF technology has been implemented in several hardware platforms including Microsemi SmartFusion2™, NXP SmartMX2™, Coherent Logix HyperX™ InsideSecure MicroXsafe™, Altera Stratix 10™, Redpine Signals WyzBee™, and Xilinx Zynq Ultrascale+™.

Not all proposed PUFs are unclonable and many have been attacked successfully in a laboratory environment. A research team from the Technical University of Berlin was able to clone an SRAM PUF within 20 hours using tools readily available in university failure analysis labs. In this work, only SRAM cells of a microcontroller were read out.

University research has shown that delay-based PUF implementations are vulnerable to side-channel attacks and recommends that countermeasures be employed in the design to prevent this type of attack. Also, improper implementation of a PUF could introduce "backdoors" to an otherwise secure system. In June 2012, Dominik Merli, a scientist at Fraunhofer Research Institution for Applied and Integrated Security (AISEC) further claimed that PUFs introduce more entry points for hacking into a cryptographic system and that further investigation into the vulnerabilities of PUFs is required before PUFs can be used in practical security-related applications. The presented attacks are all on PUFs implemented in insecure systems, such as FPGA or SRAM. It is also important to ensure that the environment is suitable for the needed security level.

In 2015, studies have also emerged claiming it is possible to attack certain kinds of PUFs with low-cost equipment in a matter of milliseconds. A team at Ruhr Universitat of Bochum, Germany demonstrated a method to create a model of XOR Arbiter PUFs and thus be able to predict their response to any kind of challenge. Their method requires only 4 CRPs which even on resource-constrained devices should not take more than about 200 ms to produce. The team was able to successfully clone PUF-based radio frequency ID (RFID) cards stored in the wallet of users while they were in their back pockets using this method and a $25 device or a near-field communication (NFC) enabled smartphone.

The attacks mentioned above range from invasive to non-invasive attacks. One of the most celebrated types of non-invasive attacks is machine learning (ML) attacks. From the beginning of the era of PUFs, it has been doubted if these primitives are subject to this type of attack. In the lack of thorough analysis and mathematical proofs of the security of PUFs, ad hoc attacks against PUFs have been introduced in the literature. Consequently, countermeasures presented to cope with these attacks are less effective. In line with these efforts, it has been conjectured that PUFs can be considered circuits, being provably hard to break. In response, a mathematical framework has been suggested, where provable ML algorithms against several known families of PUFs have been introduced.

Along with this provable ML framework, to assess the security of PUFs against ML attacks, property testing algorithms have been reintroduced in the hardware security community and made publicly accessible. These algorithms trace their roots back to well-established fields of research, namely property testing, machine learning theory, and Boolean analysis.

Mobile and embedded devices are becoming ubiquitous, interconnected platforms for everyday tasks. Many such tasks require the mobile device to securely authenticate and be authenticated by another party and/or securely handle private information. Indeed, smartphones have become a unified platform capable of conducting financial transactions, storing a user's secure information, acting as an authentication token for the user, and performing many other secure applications. The development of powerful mobile computing hardware has provided software flexibility to enable convenient mobile data processing. However, comparable mobile hardware security has been slower to develop. Due to the inherent mobility of such devices, the threat model must include use cases where the device operates in an untrusted environment and the adversary has a degree of physical access to the system. The current best practice for providing such a secure memory or authentication source in such a mobile system is to place a secret key in a non-volatile electrically erasable programmable read-only memory (EEPROM) or battery-backed SRAM and use hardware cryptographic operations such as digital signatures or encryption. This approach is expensive both in terms of design area and power consumption. In addition, such non-volatile memory is often vulnerable to invasive attack mechanisms. Protection against such attacks requires the use of active tamper detection/prevention circuitry which must be continually powered. As described in *Physical Unclone-able Functions and Applications: A Tutorial*, Charles Herder, Meng-Day (Mandel) Yu, Farinaz Koushanfar, and Srinivas Devadas, 2014.

In the physical world, the development of high-quality fake art, jewelry, watches and fashion increases the need for manufacturers to demonstrate authenticity to maintain trust with their customers and to make it harder for third parties to create counterfeit products.

Physical Unclonable Functions (PUFs) are one way to provide such solutions both for the digital and physical world. The main advantages of traditional PUFs over traditional cryptographic techniques are:

No secret key is stored in non-volatile memory where it could be discovered. Instead, a PUF takes advantage of tiny differences in the manufacture of, for example, a silicon chip whereby each is unique. Because these differences are random and outside of human control, it is practically impossible, even for the manufacturer, to make an exact copy.

It is not necessary to trust a third party. If, for example, a secret key is created by a manufacturer the purchaser has to trust that party has not made a duplicate or retained some means to break the cryptographic key. While that possibility may be remote, a PUF does not have this disadvantage.

PUFs can be constructed from cheaper components and consume less power than solutions that depend on EEPROM or SRAM memory.

The secret key disappears when power is off.

As the key is derived from the material itself any attempt to surreptitiously modify is likely to change the physical characteristics.

Authentication is the process between a prover, e.g., a hardware token or smart card, and a verifier, such as a secure server or bank, which confirms the identities, using corroborative evidence, of one or both parties. With the Internet-of-things (IoT), there are a growing number of applications that require low cost authentication. Physical Unclonable Functions (PUFs) are hardware security and trust primitives that can address issues related to low cost because they can potentially eliminate the need for non-volatile memory (NVM).

One instance of a PUF extracts randomness from variations in the physical and electrical properties of integrated circuits [IC], which are unique to each IC, as a means of generating digital secrets (bitstrings). The bitstrings are generated on-the-fly, thereby eliminating the need to store digital copies of them in NVM and are (ideally) reproducible under a range of environmental variations. The ability to control the precise generation time of the secret bitstring and the sensitivity of the PUF entropy source to invasive probing attacks (which act to invalidate it) are additional attributes that make them attractive for authentication in embedded hardware.

Capacitors, resistors, on-chip resistors and wires i.e. any electrically conductive materials depend on resistance to function. For example, resistors are common elements of electrical networks and electronic circuits and are ubiquitous in electronic equipment. A resistor is a passive two-terminal electrical component that implements electrical resistance as a circuit element. In electronic circuits, resistors are used to reduce current flow, adjust signal levels, to divide voltages, bias active elements, and terminate transmission lines, among other uses. High-power resistors that can dissipate many watts of electrical power as heat, may be used as part of motor controls, in power distribution systems, or as test loads for generators. Fixed resistors have resistances that only change slightly with temperature, time or operating voltage. Variable resistors can be used to adjust circuit elements (such as a volume control or a lamp dimmer), or as sensing devices for heat, light, humidity, force, or chemical activity. Practical resistors as discrete components can be composed of various compounds and forms. Resistors are also implemented within ICs. The electrical function of a resistor is specified by its resistance: common commercial resistors are manufactured over a range of more than nine orders of magnitude. The nominal value of the resistance falls within the manufacturing tolerance, indicated on the component.

It is known that electronic devices such as resistors may exhibit a temperature dependence on electrical resistance. The temperature coefficient of resistance describes the relationship between the resistive property of a component and the temperature of the component. The higher the coefficient, the greater the increase in electrical resistance for a given temperature increase.

A draw-back to current temperature sensing technology available for use in IoT applications is a vulnerability to security attacks and/or falsification. Traditional systems may allow an attacker to substitute the temperature sensor and the device responsible for authenticating and encrypting the reading may not know that it has been substituted. Furthermore, a faulty reading may not be detected.

SUMMARY OF THE INVENTION

It is an object to provide a security token based on a physical unclonable function (PUF) which may be used as a secure temperature sensor. It is an object to eliminate the current distinction between PUF security token and analog temperature sensor. A security token is a device or component used to store or generate a value to be used in a security application such as an authentication or encryption application. It is a further object is to improve the security of analog temperature sensors such that a PUF based security token is a temperature sensor and the temperature sensor is a PUF based security token. It is a further object to reduce the vulnerability of temperature sensing devices by combining the functions of temperature sensor and cryptographic key generation such that it is resistant to substitution or modification. It is analogous to die-packs used to secure cash in transit. If activated the die makes the cash unusable. Similarly, any attempt to modify the resistors causes the temperature sensor/PUF to fail.

With proliferation of electronic devices, and with billions of IoT devices communicating with other devices, there is a pressing and growing need for robust secure key generation. In an ideal world every such device would have a unique 'fingerprint' that is impossible to spoof, clone, or hack. Such secure key generation may be used in a multi-layered security framework.

PUF-based security tokens may advantageously be:
Stable (able to perform consistently as required under different and variable environmental conditions for the lifetime of the device that it is securing).
Affordable (able to be produced, maintained and disposed of at a price whereby customers can justify the additional upfront, ongoing and end of life cost and suppliers can make a profit) and requiring minimal energy consumption and zero maintenance).
Secure (provides robust protection against attempts to clone, spoof or hack and does not require trust in a third party).

The PUF-based security token may be constructed from any electrically conductive materials such as capacitors, wires, or a cluster of large, SMD, or on-chip resistors. Due to manufacturing and other variations, no two resistors are expected to exhibit precisely the same physical properties. It is not suitable to rely on actual resistance values to define a PUF because resistors are sensitive to and react to temperature variations. Resistors may be selected for uses that have reasonably consistent temperature coefficients of electrical resistance. The property of electrical resistance may be utilized to compare the values of two or more resistors to specify a bit in a PUF-generated security key. Multiple resistor sets may be used to specify multiple bits, for example, to specify a 128-bit key. By adding more resistors, longer and thus more secure keys can be generated for cryptographic or authentication functions. According to a feature of the resistor components, they are responsive to changes in temperature. In addition to relying on differences in resistance to specify elements of a key, one or more of the same resistor components may be used as a temperature sensor. This will result in a temperature sensor function linked to the PUF based security key so that both the key generation and temperature sensing are stable, affordable, and secure. The PUF based security token may be used for key generation, and once a key is generated, it can then be used for other purposes such as authentication and encryption.

The PUF based security token may provide a single response. Each time a PUF is queried, it may produce some stable responses and some unstable ones. These unstable ones, or noise, may be filtered out with error correction.

The PUF-based security token may be implemented with a thin film 10K Ohm 50V 100 mW 1% tolerance rated −55° to +155 C.

It is a further object to provide a secure temperature-sensing element. It has been found that the elements of a resistor network PUF may be utilized for temperature sensing. Temperature sensing may be accomplished by monitoring the electrical properties of one or more resistors in the PUF structure. For example, resistors may have a property that varies with temperature. As long as the resistance varies in a known manner, the resistance may be determined by the voltage drop across the resistor, and the voltage drop may be mapped into a temperature reading. According to an embodiment, different resistors may have different temperature responses. We use the relationship between the resistor clusters to generate the cryptographic key. We use one or many resistor clusters to measure temperature. Then we sign the temperature reading with the cryptographic key. If you change a resistor so that the temperature is different from the correct temperature, then it will also affect the PUF such that it will construct the wrong cryptographic key.

Any product can be counterfeited given a sufficient incentive. High-value physical products such as luxury handbag designs are targets for counterfeiting. The total trade in fake products is estimated at around $4.5 trillion, and fake luxury merchandise accounts for 60% to 70% of that amount, ahead of pharmaceuticals and entertainment products and representing perhaps a quarter of the estimated $1.2 trillion total trade in luxury goods.

One response to the threat of counterfeiting is to track products using a vendor database or blockchain from manufacture to end-of-life. LVMH Moet Hennessy-Louis Vuitton™, a Société Européenne ("LVMH") has launched the AURA™ platform, developed by Microsoft Corp. and ConsenSys™ with product tracking and tracing services based on blockchain technology.

A PUF-based security token can protect against counterfeit physical high-value products in combination with NFC and a vendor database or blockchain technology.

In this instance, a PUF-based security token embedded tag is either attached to or embedded in the product if practical (e.g., into the lining of a handbag) and/or is incorporated into a certificate of authenticity passport (e.g. for a piece of jewelry). In very high-value items, two PUF-based security token devices could be associated with the same product, one attached to the product and a second embedded in the certificate of authenticity passport.

The manufacturer creates the first record in the blockchain when the product is manufactured which includes a digital signature DigSigSK(PropM(O)) signed with a private key (SK) that included the PUF-based security token associated with the Object to track (O).

At each subsequent event, such as shipment, delivery into the store, and first sale, the PUF-based security token can be queried using a Standard Measuring Device (M) comprising an app and NFC to verify the product's authenticity before the event is added to the blockchain. In this instance, we store the public key (PK) in the App that is paired to the manufacturer's private key (SK).

Using the Manufacturer's Public Key (PK) and the Standard measurement Apparatus (M), the testing device applies the following decision rule:
If DigSigSK(PropM(O))
is valid, and if for the object O on the item it holds that PropM(O)=PropM(O),
then the testing device accepts the tag, otherwise not.

To supplement the scheme, anti-tamper technology can be used to prevent a genuine PUF-based security token from being added to a fake product. When we stimulate the PUF-based security token we get a unique response that cannot be cloned. The Standard measurement Apparatus (M) can be used to repeat the original test, the results of which are embedded in the digital signature previously stored on the blockchain. Because the public key derived from the unique response is stored in the blockchain it cannot be manipulated.

In essence, the solution is key-free and security-free. Source: Towards Secret-Free Security by Ulrich Rührmair, April 2019.

One benefit of this system is that it can be retroactive. Owners of high-value items can take them to the store or a trusted third party where a PUF-based security token embedded tag can be retrofitted, or a certificate of authenticity passport issued, as applicable. If the PUF-based security token is lost, stolen, or damaged this can be recorded in a vendor database or blockchain and a replacement tag issued by the store or trusted third party.

Another benefit of the system is that authentication can take place anywhere and at any time without any need for online access or real-time verification by a central authority.

A further benefit is that because the system is integrated with a vendor database or blockchain additional information such as product data can be recorded.

An alternative approach that achieves the same outcome, is that hashed values of PropM(O) can be signed and contained in the PUF-based security token. Testing will determine which approach is faster and more efficient.

With sufficient incentive, any piece of software or hardware will eventually be hacked, cloned or spoofed.

In an ideal world, every computing device would have a unique 'fingerprint' that is impossible to guess. Without rock-solid authentication trust is impossible. Secure cryptographic key generation is a vital first step in a multi-layered security framework to protect against data loss, ransomware and other damage. According to Sophos™ two out of three organizations fell victim to one or more cyberattacks in 2018 despite the fact that 26% of the IT team's time is spent on cyber-security and 91% of organizations were running up-to-date protection. The result—is stolen data, wasted time, financial cost, and damage to reputation.

In the physical world, more than 1 in 4 consumers unknowingly purchase fake products online. The Global Brand Counterfeiting Report 2018 says the amount of total counterfeiting globally reached 1.2 Trillion USD in 2017 and is bound to reach 1.82 Trillion USD by the year 2020 which includes counterfeiting of all equipment/products from defense equipment to watches.

It is an object to provide a security element to enhance a vendor database or blockchain by offering irrefutable unclonable IDs either integrated into a product or as a 'passport' where that is impractical e.g. luxury watches. The passport will also enhance the ability to create a second-hand market. Swiss luxury watchmaker Audemars Piguet™ said it would launch a second-hand business in 2018, becoming the first big brand to announce plans to tap into a fast-growing market for pre-owned premium watches. The use of a passport involves the establishment of a token to be associated with an item to be tracked but does not require the item to be retrofitted.

A PUF security element as disclosed may be used to track and trace an item to be secured. This can be done by integrating a PUF security element into the item or by incorporating the PUF security element into a separate passport. Why can't a counterfeiter simply copy the bag with an identical serial number? What happens if a thief were to steal a genuine PUF-based security token embedded tag and attempt to sell it with a counterfeit?

It is an object to provide a structure useful as a Physical Unclonable Function security element ("PUF Security Element") that produces a response that is unique to that specific instance when stimulated because of tiny variations in the material. The variations in the materials of the PUF Security element may provide a secret key that may be used in the authentication. There is no need for a physical key to be inserted in memory at the manufacture. Therefore, security is enhanced by eliminating a trusted third party to insert a key in the material.

It is a further object to provide a PUF Security element that does not include an inserted key that is subject to detection in the absence of any stimulation, thereby eliminating certain attack vectors.

It is a further object to provide a PUF Security Element that may interact using symmetric or asymmetric architecture. It is a further object to provide a PUF Security Element that may be used to generate a public/private key pair. A private key remains secret. The public key can be shared without compromising security. With a symmetric architecture, the key is shared. A request encrypted with the public key can only be decrypted by the specific PUF Security Element which may yield the private key.

It is an object to incorporate the use of blockchain to enable a user to have one PUF Security Element linked to many products manufactured by different companies.

A hybrid blockchain may be used which will make the public key/serial number relationship visible and immutable. One backend function will be to look for suspicious transactions. Then if a secret was somehow compromised, multiple fakes could not share the same serial number/PUF Security Element without raising an alert.

A private component (hereafter called a private manufacturer database) may record details of ownership and be used by companies to understand their customer purchasing habits as well as provide extra security if either the PUF Security Element (tag) or the product is lost or stolen. The usual privacy laws and processes will apply.

The private blockchain could extend the public key/serial number combination to hold a hash of a user password or biometric data such as a fingerprint. This would tie the product and owner together.

An object of the authentication system may require that a user first register to participate using a communication device such as a smartphone. A user may install an app and register to participate in the authentication system. The user may then verify that a product is authenticated; record the acquisition of a product protected by a PUF Security element; record a transfer of a product protected by a PUF security element; register a notification that a product protected by the PUF security element has been lost or stolen; and register a notice that a product they previously recorded the acquisition of may or may not be validly transferred between third parties. As an alternative to interacting with the authentication system through a smartphone app, a vendor, seller, or service provider may have the capability to accomplish the foregoing operations through a terminal.

A temperature sensing security token may include a first resistor having a first side connected to a voltage source, a second resistor having a first side connected to the voltage source, an analog comparator having a first input connected to a second side of the first resistor and a second input connected to a second side of the second resistor and an output that represents at least one bit of a key, and an analog to digital converter having an input connected to the second side of the first resistor wherein an output of said analog to digital converter is related to temperature by a temperature coefficient of resistivity of the first resistor. The first resistor and the second resistor may have the same nominal resistance. The first resistor, the second resistor, and the analog-to-digital comparator may be encased in the same package. The package may be configured to inhibit inspection and discovery of components contained in said package. A processor may be connected to a key register and to a temperature table wherein said processor may be configured to store the key bits in the key register and is configured to store data corresponding to temperature. The processor may be configured to store a time stamp associated with an entry in the temperature table. A communications interface may be connected to the processor.

The security token may include a multiple-bit security element where each bit is an output of a comparator having a first input connected to a first electrical circuit and a second input connected to a second electrical circuit wherein the first electrical circuit and the second electrical circuit are characterized by electrical components having the characteristics of a PUF. The electrical components may be resistors. The comparator may be connected to the first electrical circuit and the second electrical circuit to compare the resistance of at least one resistor in the first electrical circuit to the resistance of at least one resistor in the second electrical circuit. An analog to digital converter may be connected to at least one resistor in the first electrical circuit and wherein the at least one resistor may have a temperature coefficient of resistivity corresponding to an expected range of variations in temperature detectable by an output of the analog-to-digital converter. A processor configured to read each bit and compose a multi-bit security key. The processor may be programmed to store a value corresponding to the output of the analog-to-digital converter. The corresponding value may be the value read or a conditioned or calculated value. The processor may be programed to store a timestamp associated with said value corresponding to the output of the analog-to-digital converter. An addressable switch may be connected to a plurality of electrical resistors and the switch may be controlled by the processor to select the resistor(s) connected to the comparator.

A method for generating a secure temperature reading may include the steps of providing a plurality of first resistors having resistive values based in part on physical properties not practically predictable or cloneable, providing a plurality of second resistors having resistive values based in part on physical properties not practically predictable or cloneable, generating a key having a plurality of bits where each bit is specified by comparing resistive values of one of said first resistors with resistive values of one of the second resistors, sensing ambient temperature by the sampling voltage drop across at least one of the resistors and converting the voltage drop to a digital representation of temperature, and using the key to digitally sign the digital representation of the temperature. The key may be used to generate at least one key of an asymmetric key pair. The step of sensing ambient temperature may be done by taking a plurality of samples of the voltage drop across a plurality of resistors, converting the plurality of voltage drops to a plurality of preliminary digital representations of temperature, combining the plurality of preliminary digital representations of temperature into the representation of temperature value. A plurality of digital representations of temperature may be accumulated in a storage device and periodically transmitted or transmitted on demand.

It is a further object to provide a secure temperature sensor with enhanced accuracy in sensing temperature and enhanced accuracy in key generation. The accuracy in temperature sensing can be enhanced by using thermistors to sense temperature with the same thermistor elements being utilized in the key generation PUF. For example, 5% or more of the PUF bits may have thermistor elements. According to one configuration approximately 10% of the bits may have thermistor elements, for example, 14 out of 128 bits.

Accuracy and fault tolerance may be enhanced by incorporating additional PUF bit circuits in the design. For example, 150-bit circuits may be incorporated into the secure temperature-sensing device with the intention of a circuit with 128-bit encryption. The stability of the bits may be checked by performing multiple bit generation iterations. Any bit circuit that is not stable may be ignored in favor of a substitute bit generation circuit as part of an initial calibration.

It is a further object to provide for critical temperature sensing applications that allow for tamper proof or tamper evidence monitoring, recording, and/or reporting of temperature. Specific applications include monitoring the temperature of critical temperature sensitive substances such as food, pharmaceuticals, nuclear fuel during storage and/or transport. On Nov. 9, 2020, Pfizer announced a vaccine for COVID-19 has shown to be 90% efficacious in trials but that it must be shipped and stored at ultra-cold temperatures, −94 Fahrenheit (−70 Celsius). That requirement will limit where the vaccine can be used. Even with the infrastructure to ship and store a vaccine for widespread distribution and use, the ability to securely monitor and confirm proper temperature in shipping and storage will be crucial not only to public confidence in such a vaccine but also to the very efficacy of the vaccine.

This may be accomplished by using the temperature sensing components of the device for the dual function of sensing a change in temperature and for key generation and using the generated key in the encryption of the temperature. Temperature can be sensed using a component whose electrical characteristics change with temperature. Some resistors exhibit a stable temperature s=response, as do thermistors and platinum, for example, a platinum RTF (resistive temperature device).

The system may be connected to a communication channel that may transmit encoded temperatures. The transmission may be triggered continuously, periodically, on-demand, when communication is available, and/or upon a change in temperature, or when a change exceeds a threshold or limits.

The above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Figure 1:
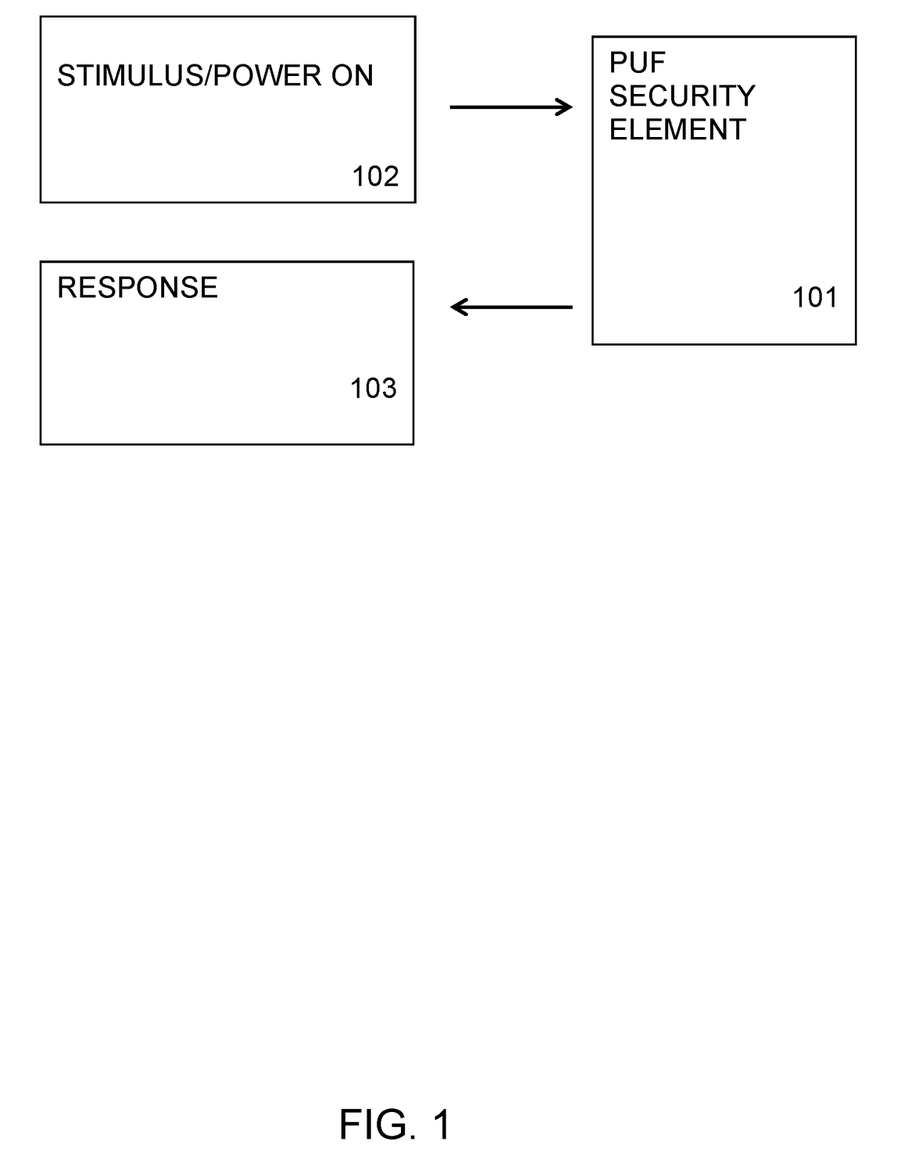
FIG. 1 shows a schematic of the stimulus-response paradigm for a PUF Security Element.
Figure 2:
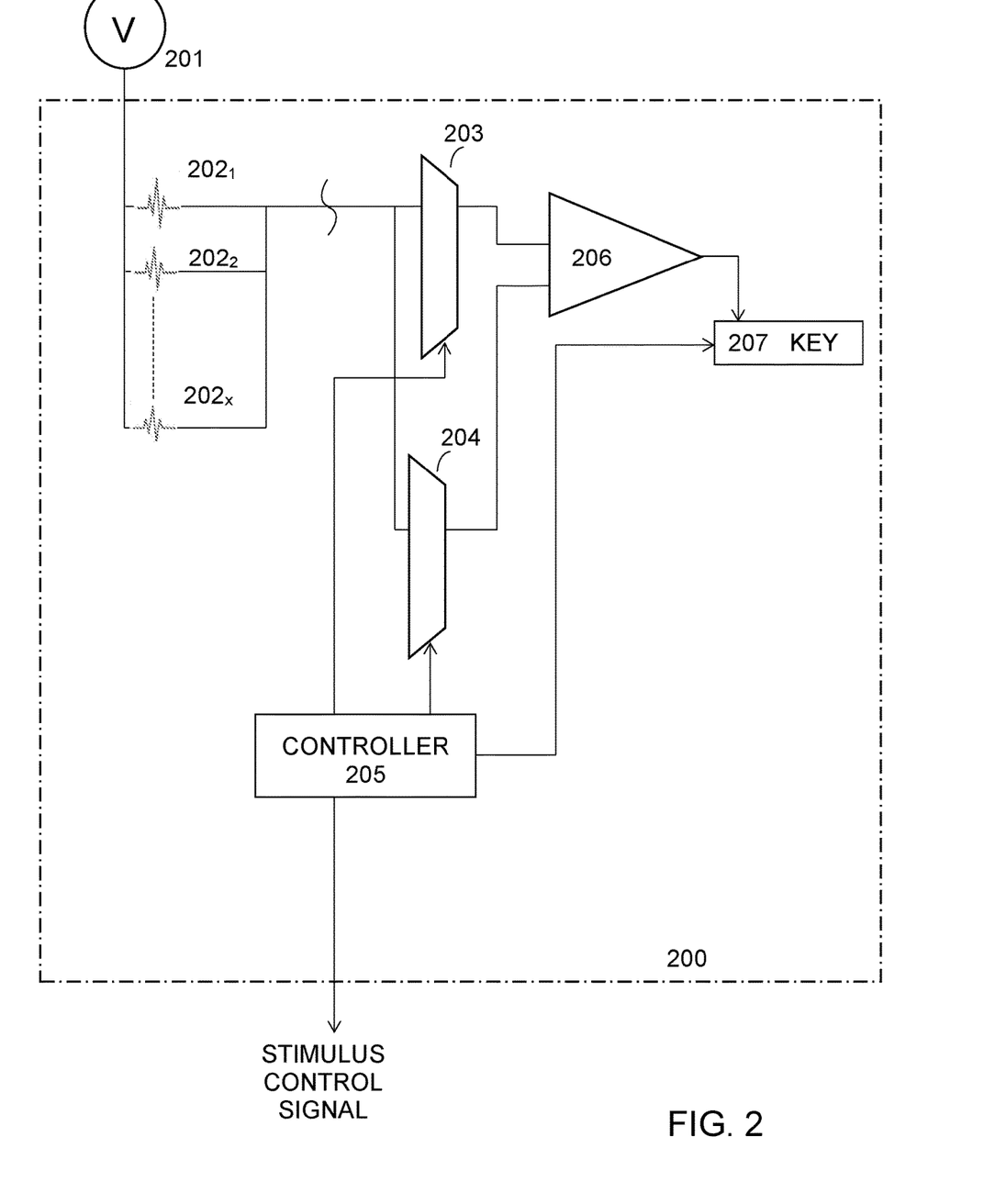
FIG. 2 shows an implementation of a PUF Security Element.
Figure 3:
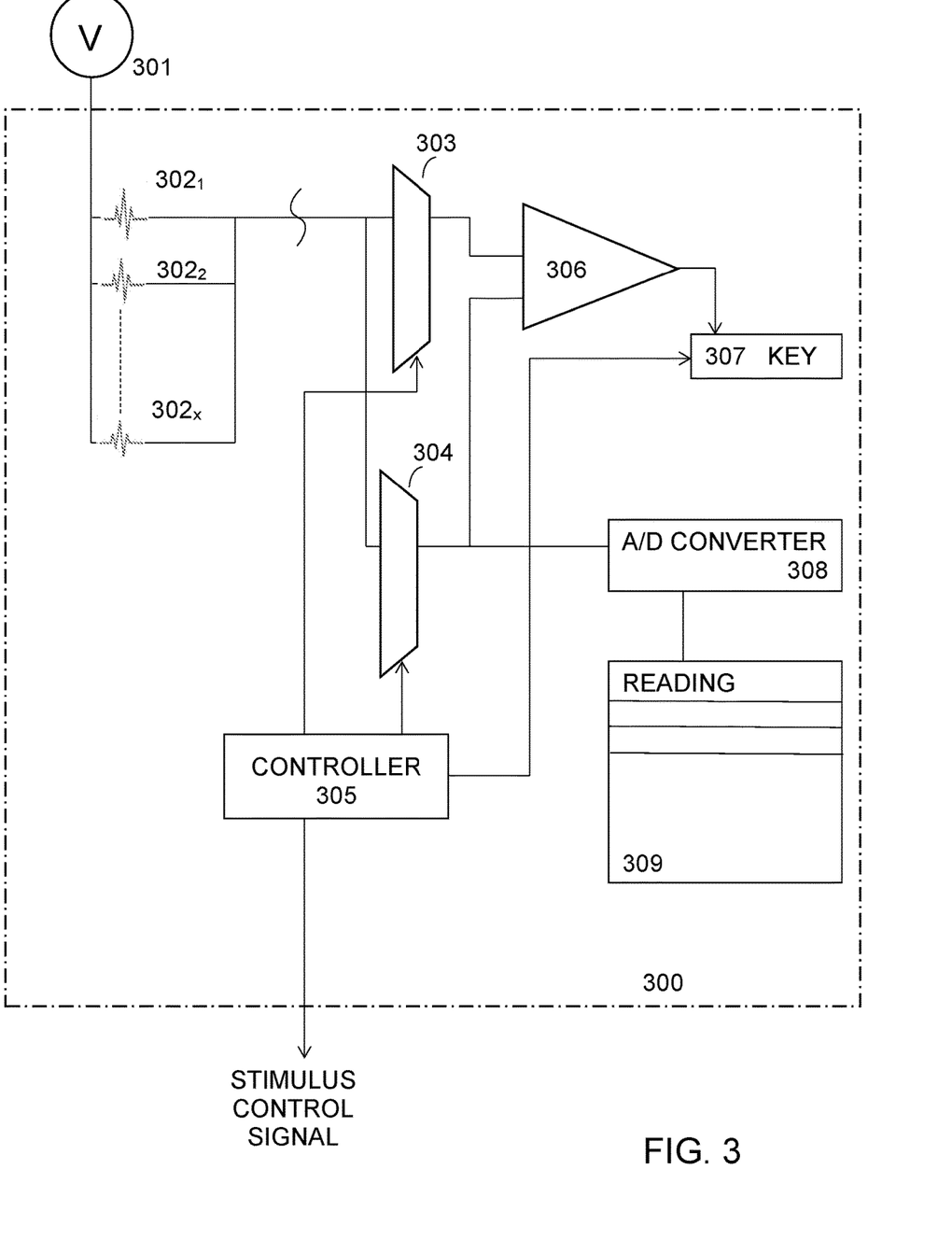
FIG. 3 shows an enhanced PUF which may be utilized to generate secure authenticated temperature readings.
Figure 4:
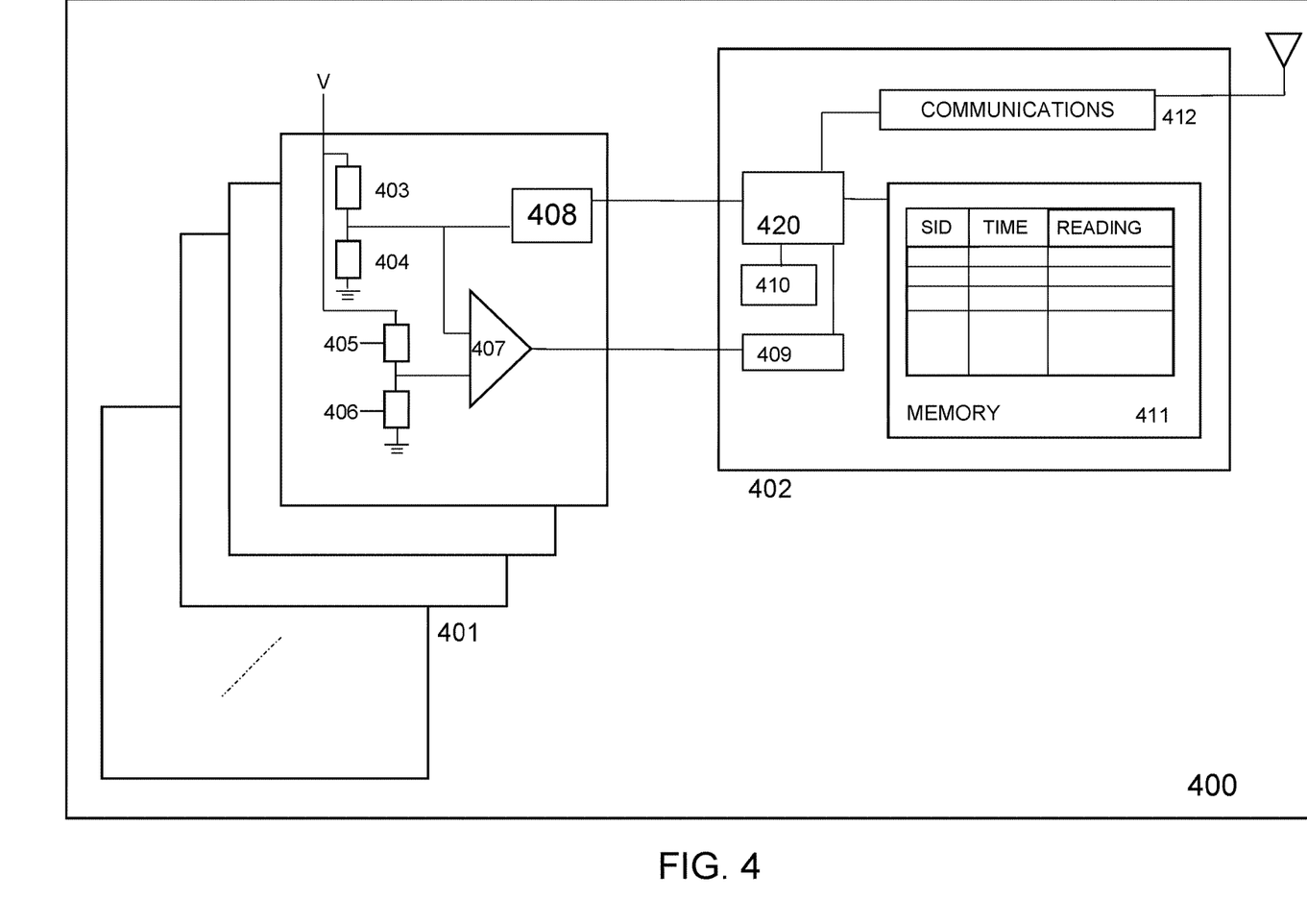
FIG. 4 shows a specialized embodiment of a PUF-based security token.

FIG. 1 shows a schematic of the stimulus-response paradigm for a PUF security element 101. The PUF security element 101 may be a manufactured item with physical properties which may be exposed to stimulus 102 in order to elicit a response. The nature of the security element is such that the response to a sufficiently complex stimulus may vary varies greatly from item to item. According to an embodiment the PUF security element 101 may create an output based on its physical structure when powered on. A stimulus 102 may be applied to a PUF security element 101. The response 103 to stimulus 102 might be described as unique, but in the embodiments illustrated in FIGS. 2-4 is pseudo-random due to the unique physical structures used to generate bit(s) for a seed or key. The response of two different PUF security elements to a common stimulus may be identical. In such a situation, the PUF security element having a response identical to a previously manufactured and/or registered security element may be discarded or may be accommodated when combined with a unique aspect of the device, for example, a MAC address of an associated microcontroller. Furthermore, it is also possible that a particular authentication modality may be able to tolerate redundant PUF security elements.

For example, a PUF security element may be deployed in order to authenticate and secure an IoT device and a second application may be provided to deploy a PUF security element to secure and authenticate a luxury consumer product. An authentication system may be established which treats the two classes of targets as individual sets and may be able to tolerate redundant security elements across product classes.

An embodiment for the application of a PUF security element may be deployed to protect physical products. The physical product may be manufactured and assigned a unique user-readable identification ID and a PUF security element. The PUF security element may be attached to or physically integrated into the product or be provided as a token such as a document or other structure to accompany the product. A manufacturer may pair a public key to a corresponding unique identification number. The public key may be paired with a private key generated by the stimulus response operation shown in FIG. 1. In addition, a vendor database or public blockchain may be established with details of the product, the public key, and the unique user-readable identification number. The vendor database or blockchain may also store the status of the product. For example, the status may be manufactured, but not yet sold; sold with an identification of the title holder; transferred to a new title holder, or transfer of the record blocked by the title holder. Once an item is disposed then this would be recorded in the vendor database or blockchain.

The title or authentication of any particular item and any transaction involving the item requires that the PUF security element generate a response that, together with a user-readable ID, can be verified in a secure central database as matching. Any transaction will require the title holder or record owner to confirm the transaction using a secure device such as a smartphone app. In this way, all transactions involving a secured device require access, preferably through multi-factor authentication, to a transactional terminal such as an app or a service provider terminal, a unique unsecured identification number, and a PUF security element. In the absence of access to all three items, no transaction can be authenticated.

In this way, a potential customer for a protected product could have enhanced confidence in authentication by utilizing an independently obtained secure smartphone app to generate a stimulus to a public security element, read a response, and transmit the response together with the unsecured identification. The potential customer will then be able to access the authentication system in a secure manner to obtain clearance of the record owner and record any change in title.

A counterfeiter will not be able to replicate the correlation between the unsecured identification number and the secured app/interface.

In a specialized form, a PUF security element may be constructed to generate an output based on the physical structures employed which are not practically controllable and without a challenge input. FIG. 2 shows an embodiment of a PUF security element that may be responsive to a challenge. The challenge, in effect, specifies which resistors of the element are to be compared to generate the response.

FIG. 4 shows an embodiment where the "response" is the generation of an output bit of a key for use in authentication and/or encryption.

FIG. 2 shows an implementation of a PUF security element 200. The PUF security element 200 may include an internal or external power supply 201. The power supply 201 may be a voltage source 201. The power supply for the control of all elements shown in FIG. 2 is not illustrated. The physical feature measured by the PUF may be provided in the form of resistors 202. A series of resistors $202_1$-$202_x$ is provided. The resistor 202 may have one side connected in common to a voltage supply 201. The output of each resistor may separately be connected to analog switch 203 and analog switch 204. Analog switches 203 and 204 may be digitally controlled by a controller 205 to select which resistor is switched through each of analog switches 203 and 204. The output of switches 203 and 204 are provided to an analog comparator 206, which has a two-state output. The output will be in a first state, for example, a digital representation of 1, if analog comparator input A is at a higher level than analog comparator input B. The output state of analog comparator 206 may, for example, be zero if the level of analog input B is greater than a level of analog input A. Controller 205 may step through a selection of a plurality of resistor circuits with the results of the comparison being provided to shift register 207. Controller 205 is responsive to a stimulus control signal in order to specify the challenge and select which resistors are compared. FIG. 2 shows an embodiment where the resistor circuit is in its simplest form, a single resistor, and the comparison is made between resistor pairs. More complex circuits may be used such as resistor bridges (shown in FIG. 4.)

It has been found that the resistance value of resistors varies due to manufacturing within a tolerance adopted by the manufacturer. Discrete resistor manufacturing often involves binning resistors within a tolerance band, however, even resistors manufactured to a specific resistance value vary within the manufacturing tolerance. The relative resistance of manufactured resistors remains relatively stable over all applicable conditions. For example, it has been found that resistance value may vary somewhat by ambient temperature in accordance with the temperature coefficient of resistivity, however, the variation will have no effect on the comparative resistance within a group of resistors as long as the temperature coefficient of resistivity is consistent within the group of resistors. It has been found that the temperature coefficient of resistivity for similarly manufactured resistors is sufficiently consistent over a set of manufactured resistors so that resistance comparisons among resistors in the set remain constant over an anticipated range of conditions. Therefore, resistor 201a will have the same polarity with respect to resistor 202b. Meaning that if the resistance value of resistor 202a is higher than the resistance value 202b at a particular temperature, the resistance value of 201a tends to remain higher than the resistance value to 202b at the other temperatures within a usable temperature range. Because of the consistent relationship between resistance levels of multiple resistor clusters, it is possible to rely on manufacturing differences of resistors to establish a physical unclonable function (PUF). In order to generate a 128-bit key at shift register 207, it is necessary to make 128 comparisons. This can be accomplished with no redundant use of resistors if 256 resistors are provided. It should be noted that the right-hand side of resistors $202_{1-x}$ illustrated in FIG. 2 are not tied together. Each resistor is separately connected to separate inputs of switch 203 and separately connected to separate inputs of 204.

FIG. 3 shows an enhanced PUF which may be utilized to generate secure authenticated temperature readings. The PUF security element 300 may include an internal or external power supply 301. The power supply 301 may be a voltage source 301. The power supply for the control of all elements shown in FIG. 3 is not illustrated. The physical feature measured by the PUF may be provided in the form of resistors 302. A series of resistors $302_1$-$302_x$ is provided. The resistors 302 may have one side connected in common to a voltage supply 301. The output of each resistor may separately be connected to analog switch 303 and analog switch 304. Analog switches 303 and 304 may be digitally controlled by a controller 305 to select which resistor is switched through each of analog switches 303 and 304. The output of switches 303 and 304 are provided to an analog comparator 306, which has a two-state output. The output will be in a first state, for example, a digital representation of 1, if analog comparator input A is at a higher level than analog comparator input B. The output state of analog comparator 306 may, for example, be zero if the level of analog input B is greater than a level of analog input A. The controller 305 may step through the selection of a plurality of clusters of resistors with the results of the comparison being provided to shift register 307. Controller 305 is responsive to a stimulus control signal in order to select which resistors are compared.

Elements 301-307 correlate to elements 201 to 207 as shown in FIG. 2 and described herein. The resistor output of one of the switches 304 may be provided to an analog-to-digital (A/D) converter 308. The A/D converter 308 corresponds to variations in temperature. The output of the A/D converter 308 may be saved as the temperature in memory 309. As the temperature of a resistor 302 varies, so does the resistance value. Once the relationship between the resistance value/voltage across the resistor and temperature is known, then the measurement of the resistance value of any resistor can be correlated to temperature. In this way, a secure PUF security element may be utilized to generate a secure temperature reading. A secure temperature reading is useful when there is a desire to authenticate temperature, such as to assure control of food or medication temperature management where spoilage may occur outside of a specified temperature range.

The embodiment illustrated in FIG. 3 may be used as a secured temperature sensor. The resistance of each resistor 302 will vary due to fluctuations in ambient temperature in accordance with the temperature coefficient of resistivity. As the temperature changes, so do the resistance of each resistor element. Changes in resistance result in a change in the voltage drop across each resistor. Therefore, the voltage drop across a resistor is related to the temperature.

Advantageously, the resistors or other unclonable electrical elements are encased in a tamper-proof or secure package such that it is not possible or at least not practical to determine the resistance/voltages without destroying the resistors or at least altering the relationships measured. The same resistors used in establishing the key should be used in the temperature measurement. In this way, any temperature reading that is signed with the generated key can only be authenticated if the resistors remain intact. Any attack that attempts to discover the key will destroy the ability to take the temperature readings and sign them. This is a significant advantage over any temperature sensor that is separate from a PUF security element in that it prevents submission of a false temperature to be signed by the security element.

The preferred embodiment may utilize the relative resistance of each resistor cluster to establish a secret key for the purpose of authentication and/or encryption (for example temperature readings). The device may include a memory and a clock which is utilized to take a series of temperature readings over time and store the readings in memory until they may be transmitted either according to a schedule or on demand.

Advantageously, the time of each reading is time-stamped. The time of each reading is recorded, authenticated, and encrypted either in relative or absolute terms, and the transmission of the temperature readings may be triggered over a period specified by a transmission temperature transmission request. The secret key of the PUF security element may be utilized in connection with a digital signature process. The digital signature authenticates the temperature reading and may be utilized to authenticate any other information made available to the device. In addition, the key may also be used in any of various available encryption schemes, including without limitation, symmetric and asymmetric, public key using PKI, RSA, and with or without a certificate authority.

Authenticated and/or encrypted data (such as temperature readings) may be sent periodically, as taken, or on demand.

An advantage of the system disclosed is that the resistor clusters are required to take the temperature readings. Other temperature sensing systems are not secure, and the security applied is limited to the transmission of unsecured temperature readings. Utilizing the disclosed system, readings are secured and authenticated and can be transmitted in an authenticated and encrypted fashion.

The embodiments disclosed the use of resistance provided by resistors as the electrical component that is unpredictable and unclonable due to variations caused by the physical structure and manufacturing process. Other components may also be utilized such as capacitors and wires because the wires that conduct electricity themselves also have a certain amount of resistance. The resistors utilized should have characteristics described but do not need to be any specific resistor type. The system may utilize surface-mounted device resistors deposited on a printed circuit board, on-chip resistors, or wires. We have tested 'through hole' resistors having 10 k Ohm resistance, 1% tolerance, temperature coefficient +/−25 ppm/° C., as well as SMD resistors, having 10 k Ohm resistance values, 1% tolerance, temperature coefficient +/−50 ppm/° K, in a 0402 case (1 mm×0.5 mm). It is also possible to use on-chip resistors, or any electrically conductive materials, such as wires, as there will be subtle variations in resistance. Thus, this PUF-based security token could also be implemented on an IC, reducing size even further.

There are numerous types of electrical components with resistance properties e.g. resistors (large, SMD, and on-chip). Factors for the selection of electrical components include cost, type, resistance, power rating, tolerance, temperature coefficient, maximum and minimum operating temperature, voltage, temperature response stability, and physical dimensions.

FIG. 4 shows a specialized embodiment of a PUF-based security token 400. The PUF-based security token may be standalone, connected to other devices such as an IoT device, or integrated into an IoT device. The PUF based security token includes PUF security element 401. FIG. 4 illustrates in further detail the components of a single bit generation for the PUF based security element 401. In practice, these components may be repeated many times, such as for example, to generate 128, 256, or any other number of bits for a secret unclonable key. Resistors 403 and 404 are connected in series between a power supply and ground. Resistors 405 and 406 are also connected in series between a power supply and ground. The junction between 403 and 404 may be connected as a first input to a comparator 407. The junction between 405 and 406 may be connected to a second input to a comparator 407. The output of the comparator 407 is indicative of the relative values of resistors 403 and 404 as compared to the relative values of resistors 405 and 406. Other component configurations may be used as long as they compare the electrical properties of at least one component to another component which remains stable with respect to each other over anticipated operating conditions.

One or more of the components of a portion of the single bit PUF security elements may be more sensitive to temperature variations than the corresponding components in other of the single bit PUF security elements. For example, 5% or 10% or 14 out of 120 PUF bits may include thermistors or platinum RTDs for one or more of the resistor elements 403, 404, 405, 406. Preferably, components should be paired. For example, 403 and 405 may both be thermistors or 405 and 406 may both be thermistors or all of 403, 404, 405, and 406 may be thermistors in a portion of the PUF single-bit generators.

The controller may use the key stored in register 409 to encrypt the output of the analog to digital converter 408 before storage in memory 411 or transmission through communications port 412.

At different temperatures, the absolute value of resistance of each of the resistors will vary according to the temperature coefficient of resistivity of the resistors. The voltage level at the junction between resistor 403 and resistor 404 is indicative of the temperature as long as the resistance values of 403 and 404 are not identical. Specifically, the variation and resistance due to temperature variations is attenuated in accordance with the ratio of resistor 403 to resistor 404. If the resistance of resistor 403 equals the resistance of resistor 404 then the attenuation is 100 percent. The relative nominal values of resistor 403 and resistor 404 may be selected to assure that the attenuation does not exceed the sensitivity of the temperature-sensing structure. Temperature sensing may be accomplished using an analog-to-digital converter 408.

The PUF-based security token 400 may include computing structure 402. The computing structure 402 may be connected to each of PUF security elements 401. The computing structure 402 may include a processor or controller 420. The processor or controller 420 may be connected to register 409 which will store each bit of the key generated by PUF security elements 401. In addition, the controller 420 may be connected to a clock 410 which may be on-board (illustrated) or connected to communications port 412. The PUF-based security token 400, computing structure 402 may also include a memory 411. Memory 411 may store temperature readings, for example, indexed by time. The temperature readings may also include a sensor or bit ID. The accuracy of the temperature reading may be enhanced by storing readings taken from multiple key element bits. The temperature may be determined by an average. Utilizing average temperature readings may increase the accuracy of the temperature reading to the extent that the resistance values of resistors utilized are distributed over a tolerance range. Alternatively, temperature readings may be more accurately interpreted by characterizing individual resistors, potentially as part of a provisioning step. The processor controller may include hardware and/or software. For authentication and encryption according to any authentication and/or encryption scheme desired. The scheme utilized is outside of the scope except to the extent that a secure key as generated by the PUF security elements is required.

To produce an N-bit key 4N resistors may be used, for example, 128-bit key may use 512 resistors according to FIG. 4.

According to the embodiment illustrated in FIG. 4 there is a single "challenge bit" that can configure the PUF's operation. Once fabricated, the resistor outputs are set, so the output bits of the PUF will always remain constant. Because the resistor PUF measures differences in output it is susceptible to the same set of environmental variations and noise sources. Therefore, error correction may be used in this application. One approach that can be taken to mitigate potential errors is to recognize that resistors that are "close" in output have a much greater likelihood of causing an output error than resistors that are "far apart". This is because the small fluctuations in output due to noise or environmental variations are less likely to cause a bit flip when the two resistor outputs are far apart.

The techniques, processes, and apparatus described may be utilized to control the operation of any device and conserve the use of resources based on conditions detected or applicable to the device.

Figure 5:
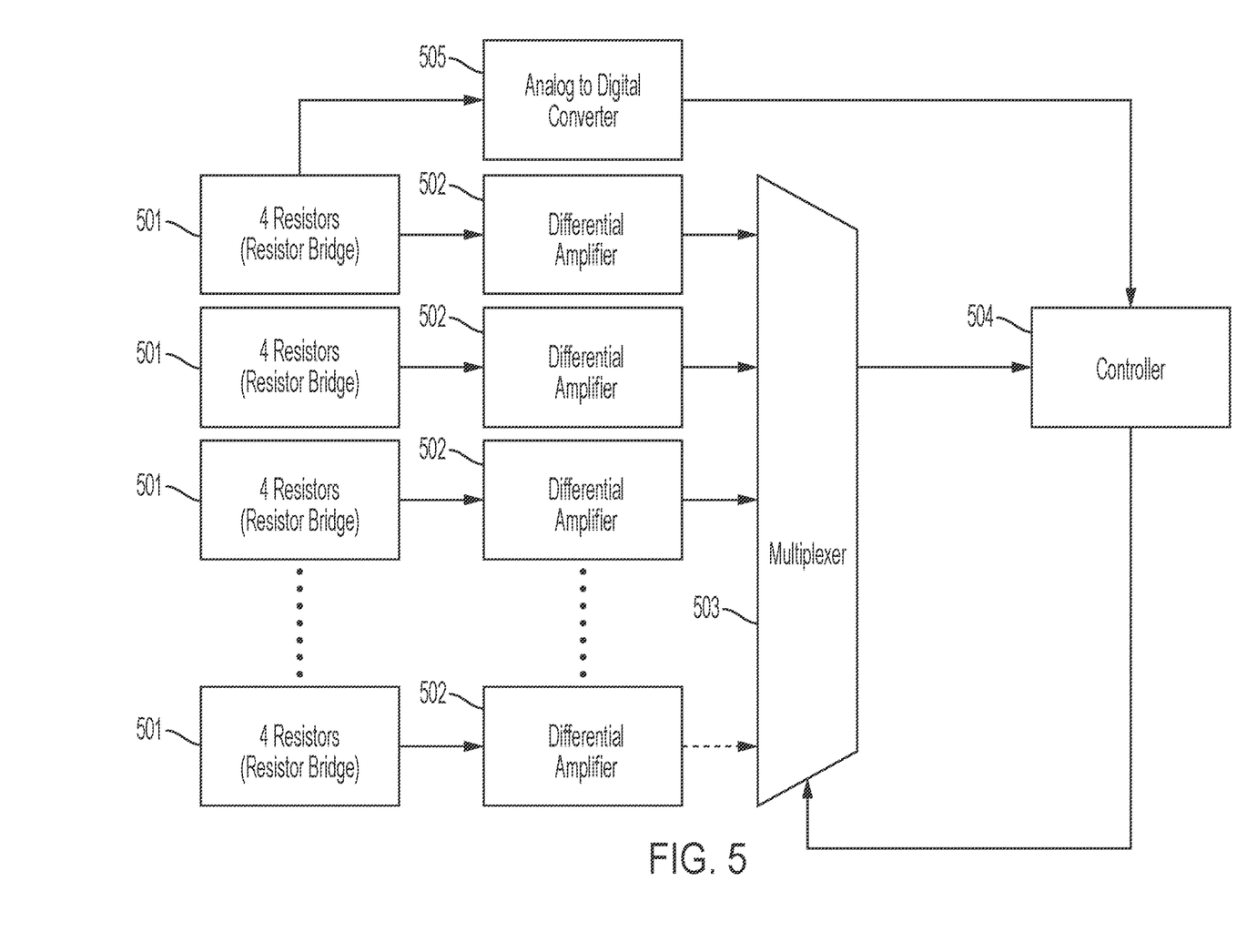
FIG. 5 shows a second specialized embodiment a PUF-based security token.

FIG. 5 shows a second specialized embodiment of a PUF-based security token with temperature sensing capability. The configuration of FIG. 5 is described based on a plurality of 4 resistor bridges 501. The embodiment may use other components which have manufacturing or other variations that are not easily controllable and not easily predictable. Each bridge 501 may have two outputs (shown in FIG. 5 as a single arrow) provided to differential amplifiers 502 may be connected to a multiplexer 503.

One or more of the components of some or all of the bridges 501 may be components responsive to a physical phenomenon, such as thermistors or other temperature-responsive components such as platinum RTDs. One or more of the bridges 501 may include other components which have enhanced stable temperature responses. The temperature-responsive bridges may be at least 5% or 10% of the bridges 501. For example, 14 out of 128 bridges may include one or more thermistors or platinum RTDs.

According to a further embodiment, the sensing components and/or the PUF elements may be other devices such as inductors, capacitors, or semiconductors.

One or more analog-to-digital converters 505 may be provided. An output of more than temperature-sensitive bridge 501 may be connected to analog-to-digital converter 505 or to additional analog-to-digital converters (not shown) each connected to controller 504. For enhanced accuracy or fault tolerance, a temperature reading may be averaged or otherwise combined by controller 504 which may use the PUF-generated key to encrypt the temperature reading or sign the temperature reading before storage in memory or transfer to a communications port.

The multiplexer 503 may be a logic circuit that can switch one of several input lines to a common output line by the application of a control signal. A microcontroller 504 may apply a control signal to the multiplexer 503 and read the common output of multiplexer 503. In this fashion, the microcontroller 504 may "read comparison results to generate a sequence of bits as the output of the PUF device.

The system may also be used as a temperature sensor. One or more Analog to Digital converters may be connected to an output of corresponding 4 resistor bridges 501. The components of the bridge 501 may have electrical characteristics that vary based on temperature and the output of the Analog to Digital converter(s) may be indicative of temperature.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, a physical unclonable function has been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A secure sensor comprising:
a plurality of electrical circuits each characterized by electrical components having electrical characteristics based in part on physical properties that are not practically predictable and not practically cloneable, wherein said plurality of electrical circuits are arranged in pairs, each including a first electrical circuit characterized by at least one electrical component having electrical characteristics based in part on physical properties that are not practically predictable and not practically cloneable and a second electrical circuit;
one or more comparators connected to a corresponding pair of electrical circuits and having a first input connected to sense an electrical characteristic of a first electrical circuit of said corresponding pair and a second input connected to sense an electrical characteristic of a second electrical circuit of said corresponding pair and wherein each comparator has an output representing a comparison between said first input and said second input;
a controller configured to establish a multibit key based on a plurality of comparisons of one or more of said first electrical circuits to one or more of said second electrical circuits;
an analog to digital converter connected to at least one electrical component of at least one of said first electrical circuits characterized by at least one electrical component having electrical characteristics based in part on physical properties that are not practically predictable and not practically cloneable and wherein said at least one electrical component has a sensor; and
wherein said controller is further configured to sign an output of said analog to digital converter with said multibit key.

2. The secure sensor according to claim 1 wherein said at least one condition is temperature.

3. The secure sensor according to claim 1 wherein said controller is configured to store a value corresponding to said output of said analog to digital converter.

4. The secure sensor according to claim 3 wherein said controller is configured to store a timestamp associated with said value corresponding to said output of said analog to digital converter.

5. The secure sensor according to claim 4 further comprising a communications interface connected to said controller.

6. The secure sensor according to claim 5 wherein said controller is configured to use said multibit security key to encrypt an output of said analog to digital converter to generate an encrypted output.

7. The secure sensor according to claim 6 wherein said controller is configured to store said encrypted output.

8. A method for generating a secure sensor output comprising the steps of:
providing a plurality of electrical components having electrical characteristics based in part on physical properties that are not practically predictable or cloneable wherein said electrical components have consistent responses to a physical phenomenon;
generating a key having a plurality of bits where each bit is specified by comparing outputs of a pair of said electrical components;
sensing said physical phenomenon by sampling an output of at least one of said electrical components and converting said output to a digital representation of said physical phenomenon wherein said at least one of said electrical components sampled is one of a pair used to generate said key; and
using said key to digitally sign said digital representation of said physical phenomenon.

9. The method for generating a secure sensor output according to claim 8 wherein said sensor output is a temperature reading, said electrical components are thermistors, and said physical phenomenon is temperature.

10. The method of generating a secure sensor output according to claim 8 wherein said key is used to generate at least one key of an asymmetric key pair.

11. The method for generating a secure sensor reading according to claim 10 further comprising the steps of:
accumulating a plurality of digitally signed digital representations of said physical phenomenon and storing a time stamp associated with a digitally signed digital representations of said physical phenomenon in a storage device.

12. A security token comprising:
a multiple bit security element where each bit is established by a comparison of an output of a first electrical circuit relative to an output of a second electrical circuit wherein the first electrical circuit and the second electrical circuit are characterized by electrical components having the characteristics of a physical unclonable function and have consistent responses to a physical phenomenon;
an analog to digital converter connected to an electrical component of said first electrical circuit and wherein said electrical component has a response to said physical phenomenon representing a variation in said physical phenomenon detectable at an output of said analog to digital converter and wherein said electrical component is also determinative of said comparison; and
a processor configured to compose a multiple bit security key from a plurality of comparisons and use said multiple bit security key to sign said output of said analog to digital converter as a signed reading of said physical phenomenon.

13. The security token according to claim 12 wherein said electrical components are thermistors and said physical phenomenon is temperature.

14. The security token according to claim 12 further comprising a memory and wherein said processor is configured to store a signed reading of said physical phenomenon and a timestamp associated with said signed reading of said physical phenomenon in said memory.

15. The security token according to claim 14 wherein said first circuit further comprises an addressable switch connected to a plurality of electrical components and said switch is responsive to said processor to control connection of one or more of said electrical components to said comparator.

* * * * *